Sept. 7, 1954 H. C. B. EVERTSZ 2,688,694

FREQUENCY DETECTOR

Filed April 12, 1952

INVENTOR

Hendrik Cornelis Bennebroeck Evertsz'

BY Fred M Vogel

AGENT

Patented Sept. 7, 1954 2,688,694

UNITED STATES PATENT OFFICE 2,688,694

FREQUENCY DETECTOR

Hendrik Cornelis Bennebroeck Evertsz, Hilversum, Netherlands, assignor to Hartford National Bank and Trust Company, Hartford, Conn., as trustee Application April 12, 1952, Serial No. 281,969

Claims priority, application Netherlands April 18, 1951

8 Claims. (Cl. 250—27)

This invention relates to frequency detectors and may be used inter alia in receivers for frequency-modulated oscillations for automatic frequency-control and the like purposes.

According to the invention the oscillations to be detected are supplied in push-pull to two delay lines closed by resistors of their surge impedances and amplitude detectors, the output impedances of which are connected in series in opposite senses, are connected to the closing resistors, the junction of the detector output impedances being connected to the input of one of the delay lines, these output impedances being included in the output circuit of the frequency detector.

In one embodiment of the frequency detector according to the invention, in which the electrical lengths of the delay lines are equal to one another and are 90° for the central frequency of the oscillations to be detected, it is advantageous, with regard to distortion to supply only part of the output voltages of the delay lines to the amplitude detectors.

In order to obtain high sensitivity, which, of course, implies greater distortion, the two delay lines may be extended by an electrical length corresponding to a phase shift of $n \times 2\pi$.

In order to increase the detector sensitivity, the voltage-division ratios of the potentiometers may be different. In order to ensure a very small distortion of the frequency detector, the electrical length of one delay line in a preferred embodiment of the invention exceeds 90° (of the central frequency), the length of the other delay line being smaller than 90°, the tappings of the potentiometer closing the delay lines being chosen such that the voltage taken from the first delay line and supplied to the associated amplitude detector is lower than the voltage supplied to the other amplitude detector and taken from the second delay line.

It should be noted that the delay lines may be constructed in the form of Lecher systems or, for example, of cable imitations or wave-guide systems.

Figure 1:
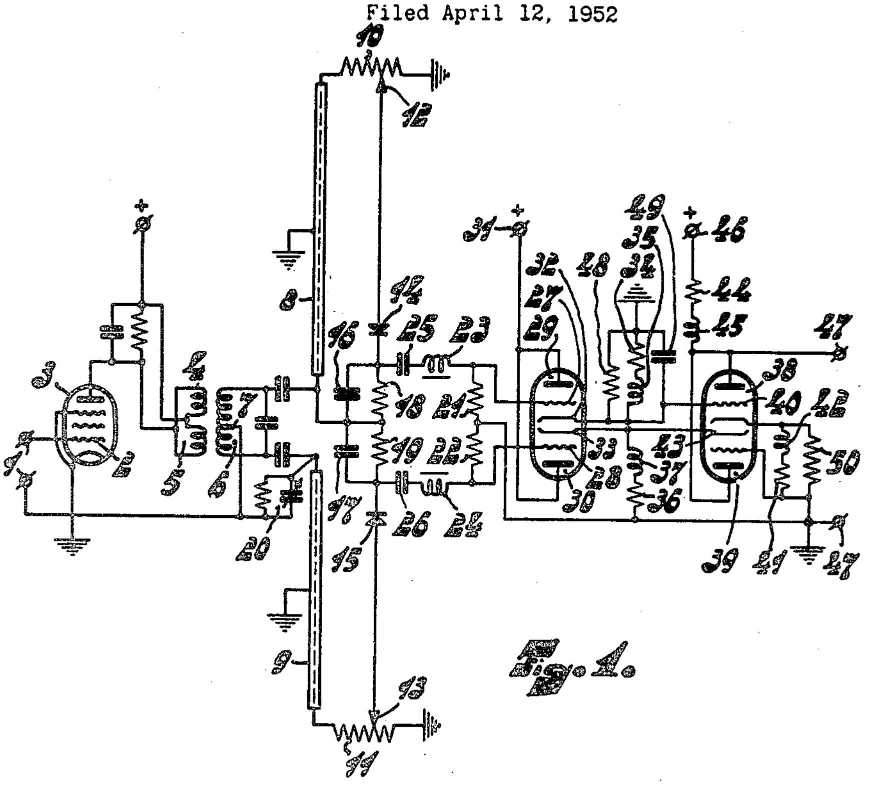
Figure 2:
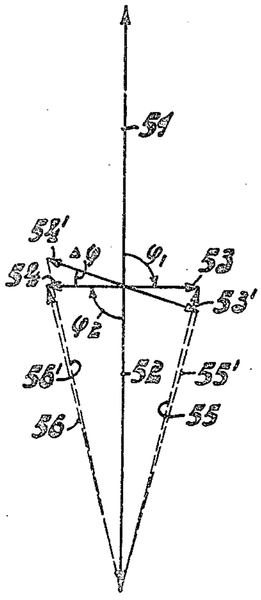
Figure 3:
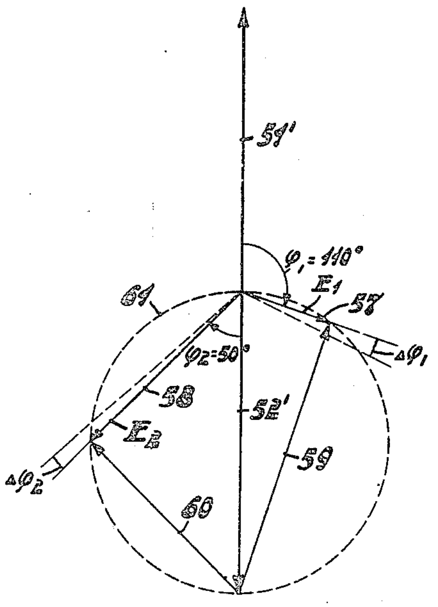

In order that the invention may be readily carried into effect, an example will now be described in detail with reference to the accompanying drawings, in which:

Fig. 1 shows one embodiment of a frequency detector according to the invention and Figs. 2 and 3 show vector diagrams to explain the operation of the frequency detector shown in Fig. 1.

Referring to Fig. 1, oscillations to be detected are supplied to terminals 1, for example, intermediate-frequency oscillations, in a frequency-modulation receiver, the central frequency being, for example, 100 mc./s. and the maximum frequency sweep being 6 mc./s. These oscillations are supplied to the control-grid 2 of an intermediate-frequency amplifying tube 3, the anode circuit of which comprises a bandpass filter 4, having a primary circuit 5 and a secondary circuit 6, these circuits being tuned and coupled for example exactly over-critically, in a manner such that a flat passage curve is obtained in the frequency range, in which the spectrum of the frequency-modulated oscillation occurs. A central tapping 7 of the secondary circuit 6 is connected to earth.

Voltages occurring in push-pull at the ends of the secondary circuit are supplied to delay lines 8 and 9, each of which is constituted by a coaxial cable having an outer sheath connected to earth. The delay cables 8 and 9 are closed by their surge impedances by means of closing resistors 10 and 11 respectively. To a tapping 12 of the closing resistor 10 is connected a rectifier 14 and to a tapping 13 of the closing resistor 11 a rectifier 15. Working resistors 18 and 19, shunted by capacitors 16 and 17 respectively are connected to the rectifiers 14 and 15 respectively, these resistors being connected in series in opposite senses as far as the detection voltages across these resistors are concerned. The junction of the resistors 18 and 19 and that of the capacitors 16 and 17 are connected to the input of the delay cable 8. In order to obtain a correct balancing of the input circuits of the delay lines 8 and 9, the input of the delay line 9 is connected to earth through an adjustable balancing network 20, comprising a resistor and a capacitor.

The detector output circuit is in push-pull and comprises two series-connected output resistors 21 and 22, the junction of which is connected to earth, whilst the ends of these resistors remote from one another are connected through a choke 23 and 24 respectively in series with the capacitor 25 and 26 respectively to the ends of the resistors 18 and 19 respectively remote from one another.

The detected voltages thus occurring across the output resistors 21 and 22 in push-pull are supplied to control-grids 27 and 28 respectively of two push-pull connected triode amplifying systems, operating as separating amplifiers 29 and 30 respectively, which are both housed in one tube in the embodiment shown. The amplifying systems 29 and 30, the anodes of which are connected to one another and to a terminal 31 of an anode supply, have separate cathodes 32 and 33 respectively and are connected as cathode-followers. The output impedances of the amplifiers 29 and 30 are constituted by a cathode resistor 34 in series with a coil 35 to improve the frequency characteristic connected between the cathode 32 and earth and a cathode 36 in series with the coil 37 connected between the cathode 33 and earth. The output voltages of the separating amplifiers thus occur in push-pull across the said output impedances.

If the detected output voltage of the frequency detector has a large bandwidth, for example, if, as in the case of the embodiment shown, the frequency detector is used in a television receiver having a large frequency band, and if the voltages taken in push-pull from the frequency detector must be taken from a single-phase output circuit, it is advantageous, instead of using a transformer, as is common practice to do, to supply the push-pull output voltages of the separating amplifiers 29 and 30 to a device comprising two triode amplifying systems 38 and 39, housed, in the present case, in a single bulb.

The voltages across the output impedance 34, 35 is supplied to the control-grid 40 of the triode 38, the cathode of which is connected to earth through a resistor 41 in series with a coil 42. The voltage across the output impedance 36 and 37 is supplied to the cathode 43 of the triode 39, the control-grid of which is connected to earth. The anodes of the two triode amplifying systems are connected in parallel with one another and through a common output impedance formed by an anode resistor 44 in series with a coil 45 to a terminal 46 of an anode voltage supply.

The detected voltage supplied in push-pull to the amplifiers 38 and 39 consequently occurs in co-phase across the anode output circuit 44, 45 thereof and is taken through terminals 47 from the circuit for further operations in the receiver.

Since the push-pull output voltages of the separating amplifiers 29 and 30 are supplied to the control-grid 40 of the triode 38 and to the cathode 43 of the other triode 39 respectively, the circuit may exhibit unsymmetry. To restore symmetry, the control-grid 40 of the triode 48 is connected to earth through a resistor 48, shunted by a capacitor 49, whilst the cathode of this tube is connected to earth through a resistor 50.

Fig. 2 shows a vector diagram of the voltages occurring in the frequency detector shown in Fig. 1, for the case in which for the central frequency of the oscillations to be detected the electrical lengths of the delay lines 8 and 9 are equal to one another and amount to 90°. Since push-pull voltages are supplied to the delay lines (shown in Fig. 2 by vectors 51 and 52) the voltages at the tappings of the closing resistors 10 and 11 may be represented by vectors 53 and 54 for an input signal of central frequency. These voltages are at right angles to the voltage vectors 51 and 52 and are equal to and in phase opposition to one another. A voltage corresponding with vector 55 is then supplied to the rectifier 14, this voltage being obtained by adding up the vectors 51 and 53; a voltage represented by vector 56, corresponding to the sum of the vectors 52 and 54 is supplied to the rectifier 15. Direct voltages proportional to the difference between the vectors 55 and 56 in value and sense occur across the output resistors 21 and 22 of the frequency detector; in the present case, in which the frequency of the moment of incoming corresponds with the central frequency, these voltages have equal amplitudes, but opposite polarities, so that the resultant output voltage of the frequency detector is zero.

If the frequency at the moment of incoming diverges from the central frequency, the vectors 53 and 54 turn through a definite angle $\Delta\varphi$, as is shown in Fig. 2 by vectors 53′ and 54′. The voltages corresponding to the vectors 55′ and 56′, supplied to the rectifiers 14 and 15 respectively now have different values and an output voltage occurs across the output circuit of the frequency detector.

However, a certain amount of distortion occurs in this case, increasing in accordance with the variation of the angles between the vectors 55 and 56 and the vector 52. The variation of these angles with the frequency and hence the distortion become smaller according as the length ratio the vectors 52, 53, 54 increases. An increase in this ratio by the choice of a suitable division ratio of the potentiometers 10, 12 and 11, 13 involves, however, a decrease in detector sensitivity. A particularly favourable compromise may be obtained between the sensitivity of the frequency detector and the distortion by choosing the electrical length $\varphi_1$ of the delay line 8, represented in the vector diagram of Fig. 2 by the angle $\varphi_1$ for the central frequency of the oscillations to be detected to exceed 90° and the length of the delay line 9, represented by the angle $\varphi_2$, to be smaller than 90° and by choosing the tappings of the potentiometers 10, 12 and 11, 13 closing the delay lines 8 and 9 respectively to be such that the voltage $E_1$ taken from the delay line 8 and supplied to the associated amplitude detector 14 (represented in the vector diagram of Fig. 3 by the vector 57) is smaller than the voltage $E_2$, supplied to the other amplitude detector 15 and taken from the delay line 9 (represented by the vector 58).

The voltages $E_1$ and $E_2$ (vectors 57 and 58) are preferably chosen with respect to the electrical lengths $\varphi_1$ and $\varphi_2$ to be such that in the vector diagram shown in Fig. 3 the ends of the vectors 59 and 60 respectively representing the supply voltages of the amplitude detectors lie approximately on the circumference of a circle 61, the central line of which is the vector 52, which represents the push-pull input voltage supplied to the junction of the detector output impedances 16, 18 and 17, 19.

As is evident from the vector diagram, since the angles included between the vectors 57, 58 and between the vectors 59 and 60 are respectively 90°, the directions of the vectors 59 and 60 will remain substantially the same in the case of frequency variation and thus a drastic restriction of the distortion will be obtained.

However, in the present case the vectors 57 and 58 will rotate in accordance with the frequency through relatively different angles $\Delta\varphi_1$ and $\Delta\varphi_2$ respectively, which may give rise to a certain disturbance of balance which may be obviated by choosing the voltage vectors 57 ($E_1$) and 58 ($E_2$) and the electrical lengths $\varphi_1$ and $\varphi_2$ to be such that the relation $E_1.\varphi_2=E_1.\varphi_2$ is substantially fulfilled, in other words that the amplitude variations of the vectors 59 and 60 are approximately equal and in phase opposition to one another.

By choosing the lengths $\varphi_1$ and $\varphi_2$ to be 110° and 50° respectively and by using a voltage $E_2$, which is approximately 5/3 $E_1$, a maximum sensitivity is obtained with a very slight distortion. With input voltages of about 5 v., the sensitivity is about 0.1 v./mc. of frequency sweep, whilst the distortion level becomes less than —70 db, owing to the variation of the angles between the vectors 60, 59 and the vector 52' shown in Fig. 3.

What I claim is:

1. A detector for frequency-modulated oscillations comprising first and second delay lines each having an input and an output, first and second resistors terminating the outputs of said first and second lines respectively and having values equal to the surge impedance of said lines, means to apply said oscillations in push-pull to the inputs of said lines, first and second rectifiers, first and second serially-connected output impedances, said first rectifier being connected between the first end of said first impedance and a point in said first resistor, said second rectifier being connected in opposition to said first rectifier between the free end of said second impedance and a point in said second resistor, means connecting the junction of said serially-connected impedances to the input of one of said lines, and an output circuit coupled across said serially-connected impedance.

2. A frequency detector as claimed in claim 1, characterized in that, in order to increase the sensitivity of the detector, the delay lines have unequal lengths $\varphi_1$ and $\varphi_2$.

3. A frequency detector as claimed in claim 2, characterized in that the lengths of the delay lines are $\varphi_1+n.2\pi$ and $\varphi_2+n.2\pi$, where $n$ designates a whole number.

4. A frequency detector as claimed in claim 2, characterized in that the electrical length $\phi_1$ of said first delay line exceeds 90° of the central frequency and the length $\varphi_2$ of the said second delay line is smaller than 90°, whilst the rectifiers are connected to said points on the surge resistors constructed as potentiometers, these points being disposed at positions such that the voltage $E_1$ taken from the first delay line and supplied to the first rectifier is smaller than the voltage $E_2$ supplied to the rectifier and taken from the second delay line.

5. A frequency detector as claimed in claim 4, characterized in that said potentiometers are provided with taps producing predetermined values of the voltages $E_1$ and $E_2$ and wherein the voltages $E_1$ and $E_2$ are relative to the electrical lengths $\varphi_1$ and $\varphi_2$ such that in a vector diagram the ends of the vectors representing the supply voltages of the rectifiers lie substantially on the circumference of a circle, of which the central line is a vector which represents push-pull input voltage supplied to the junction of the detector output impedances.

6. A frequency detector as claimed in claim 5, characterized in that the voltages $E_1$ and $E_2$ and the electrical lengths $\varphi_1$ and $\varphi_2$ are such that the relation $E_1.\varphi_1=E_2.\varphi_2$ is substantially fulfilled.

7. A frequency detector as claimed in claim 6, characterized in that the lengths $\varphi_1$ and $\varphi_2$ are approximately 110° and 50° respectively and the voltage $E_1$ is about 5/3 $E_1$.

8. A frequency detector as claimed in claim 7, characterized in that the oscillations to be detected are supplied in push-pull to the delay lines via a bandpass filter tuned to the central frequency.

References Cited in the file of this patent

UNITED STATES PATENTS

| Number | Name | Date |
|---|---|---|
| 2,091,271 | Conklin | Aug. 31, 1937 |
| 2,402,421 | Lindenblad | June 18, 1946 |
| 2,415,468 | Webb | Feb. 11, 1947 |
| 2,436,828 | Ring | Mar. 2, 1948 |
| 2,479,208 | Byrne et al. | Aug. 16, 1949 |
| 2,499,742 | Goodall | Mar. 7, 1950 |

FOREIGN PATENTS

| Number | Country | Date |
|---|---|---|
| 619,864 | Great Britain | Mar. 16, 1949 |